(12) United States Patent
Brunner et al.

(10) Patent No.: US 8,073,248 B2
(45) Date of Patent: Dec. 6, 2011

(54) AUTOMATIC DETECTION OF CALIBRATION CHARTS IN IMAGES

(75) Inventors: Ralph T. Brunner, Cupertino, CA (US); David Hayward, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1165 days.

(21) Appl. No.: 11/811,214

(22) Filed: Jun. 8, 2007

(65) Prior Publication Data

US 2008/0304741 A1  Dec. 11, 2008

(51) Int. Cl.
*G06K 9/00* (2006.01)
*G06K 9/46* (2006.01)
*G06K 9/66* (2006.01)
*G06K 1/00* (2006.01)
*G06F 15/00* (2006.01)

(52) U.S. Cl. ........ 382/165; 382/162; 382/181; 382/190; 358/1.9

(58) Field of Classification Search ................ 382/162, 382/165, 181, 190; 358/1.9
See application file for complete search history.

(56) References Cited

U.S. PATENT DOCUMENTS

| | | | |
|---|---|---|---|
| 6,254,385 B1 * | 7/2001 | Jung et al. | 433/26 |
| 6,726,476 B2 * | 4/2004 | Jung et al. | 433/26 |
| 2002/0051158 A1 * | 5/2002 | Ohkubo | 358/1.9 |
| 2005/0128495 A1 * | 6/2005 | Arai | 358/1.9 |
| 2008/0080781 A1 * | 4/2008 | Pote et al. | 382/255 |
| 2009/0066819 A1 * | 3/2009 | Ando | 348/254 |

FOREIGN PATENT DOCUMENTS

WO   WO 2006098356 A1 *  9/2006

* cited by examiner

*Primary Examiner* — Bhavesh Mehta
*Assistant Examiner* — Bernard Krasnic
(74) *Attorney, Agent, or Firm* — Blakely, Sokoloff, Taylor & Zafman LLP

(57) ABSTRACT

Methods and apparatuses for locating an embedded color chart in an image are described. In one exemplary method, an image that includes an embedded color chart is located without the intervention of the user. The embedded color chart is verified and used to create a color profile of the image. Furthermore, the orientation angle of the color chart is determined and the image orientation is fixed based on this angle.

29 Claims, 15 Drawing Sheets

US 8,073,248 B2

AUTOMATIC DETECTION OF CALIBRATION CHARTS IN IMAGES

FIELD OF THE INVENTION

This invention relates generally to image processing and more particularly to automatically detecting a color calibration charts embedded in a digital image.

BACKGROUND OF THE INVENTION

A color calibration chart ("color chart") is an array of several blocks of known color values that is used to calibrate and evaluate the color in cameras and other systems capable of color reproduction. Each of the squares represent different colors that are typically used in color images, such as white, black, different levels of gray, as well as colors representing human skin, foliage, and blue sky. Color charts are typically used photography, graphic arts, electronic publishing, and video production to check cameras (still and video), printers, scanners, monitors, or any other equipment used in the color reproductions system.

A photographer will typically take a picture of a scene that includes the color chart. The photographer can do this for every picture, or for a representative picture in a sequence of pictures. In the post-processing of the image, in one embodiment, a user would manually check the color of the some or all of the color squares in the reproduced color chart and adjust the reproduced color until the color of the square matched or closely approximated the known color. In an alternate embodiment, the user would select the color chart in the image and a computer would detect the selected color chart and use this chart to calibrate the image.

However, this process requires the user to manually select the color chart, or manually check each of the squares to calibrate the image. In addition, these methods known in the art require the color chart be horizontal with the image, which means that the color chart cannot be oriented at an angle other than zero to the image.

SUMMARY OF THE DESCRIPTION

Methods and apparatuses for locating an embedded color chart in an image are described. In one exemplary method, an image that includes an embedded color chart is located without the intervention of the user. The embedded color chart is verified and used to create a color profile of the image. Furthermore, the orientation angle of the color chart is determined and the image orientation is fixed based on this angle.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 2:
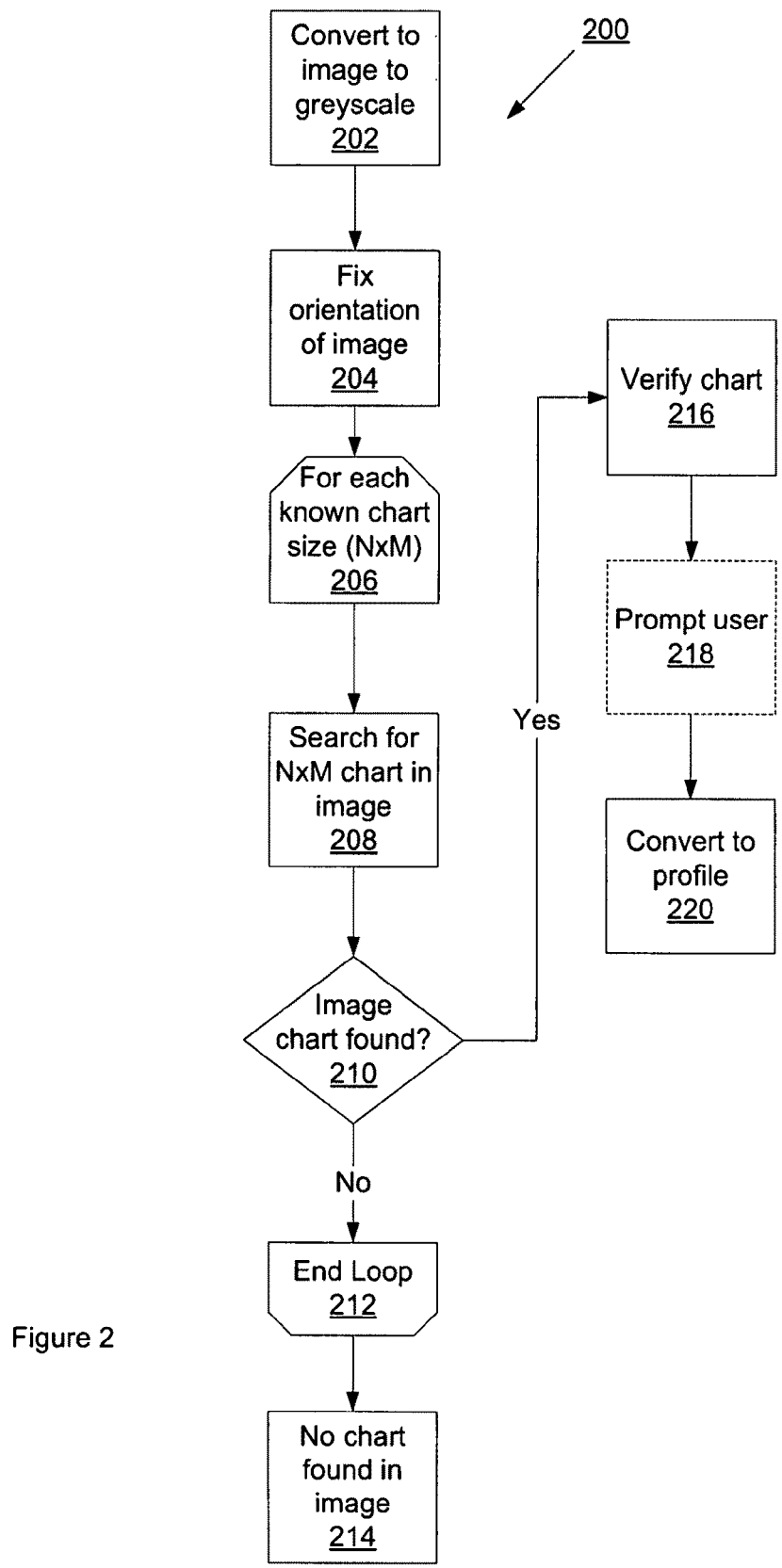
FIG. 2 is a flow chart of one embodiment of a method to detect an embedded color chart in an image and create a color profile for that image.
Figure 3:
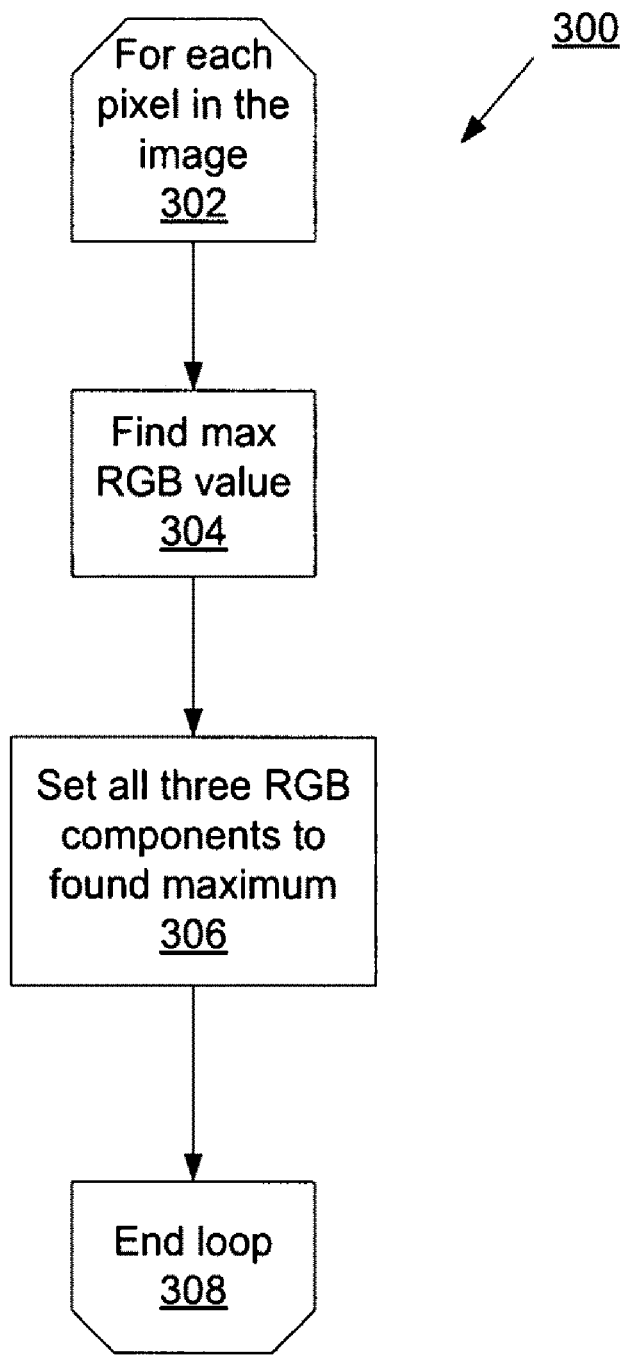
FIG. 3 is a flow chart of one embodiment of a method to convert the image to grayscale based on the maximum luminance for pixel.
Figure 5:
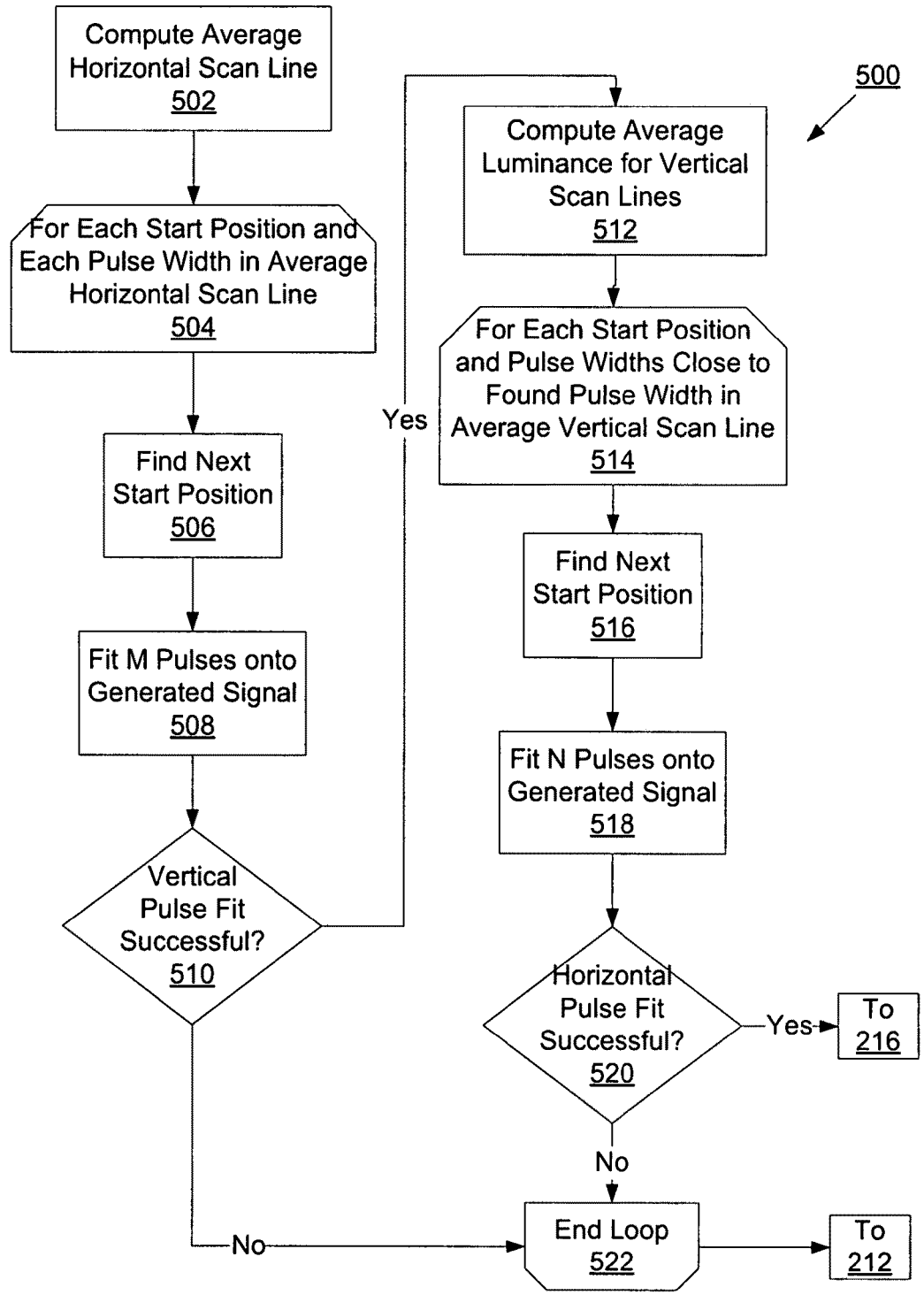
FIG. 5 is a flow chart of one embodiment of a method to locate a color chart embedded in an image.
Figure 6A:
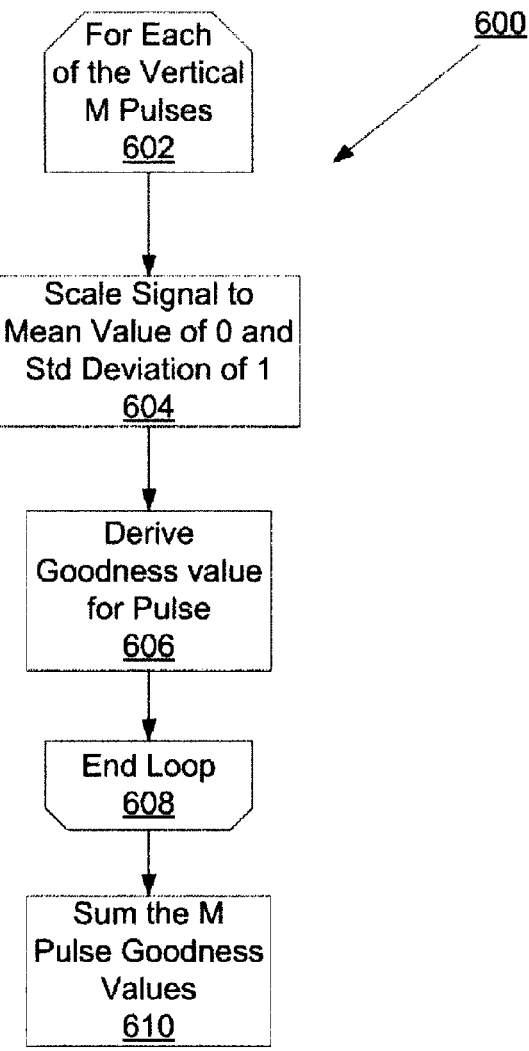
FIG. 6A is a flow chart of one embodiment of a method to measure the fit of M pulses onto a vertical generated signal.
Figure 8:
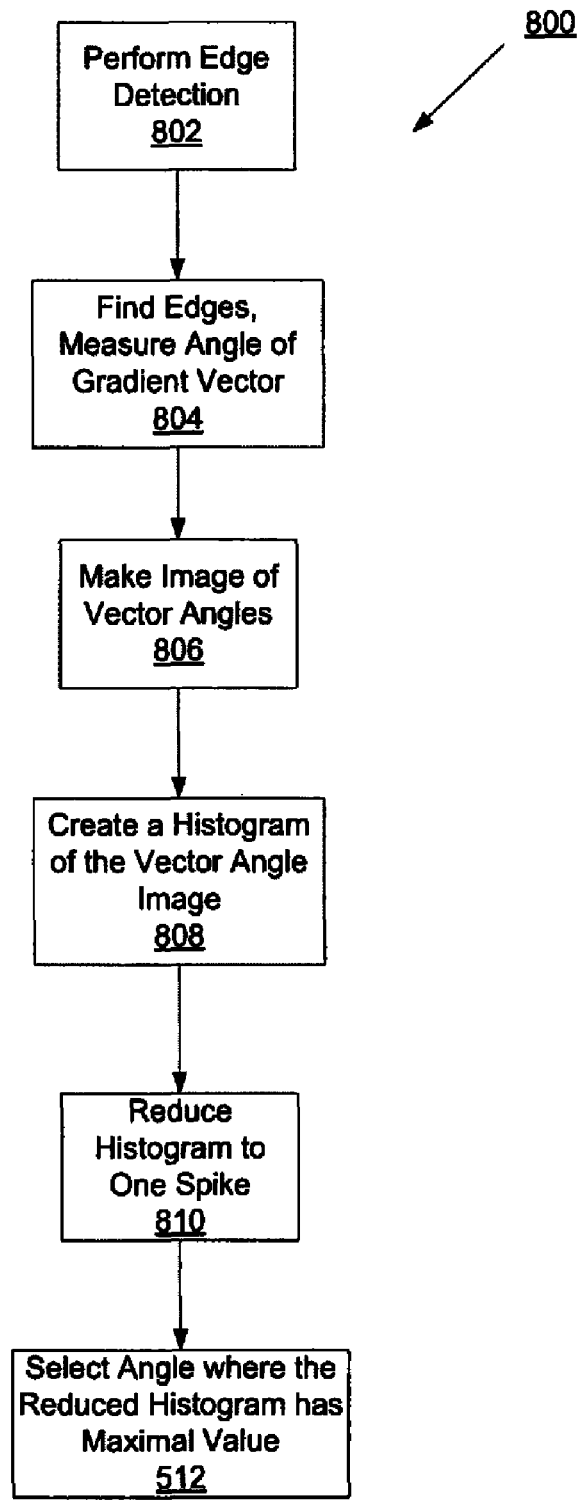
FIG. 8 is a flow chart of one embodiment of a method to fix the orientation of the image.
Figure 11:
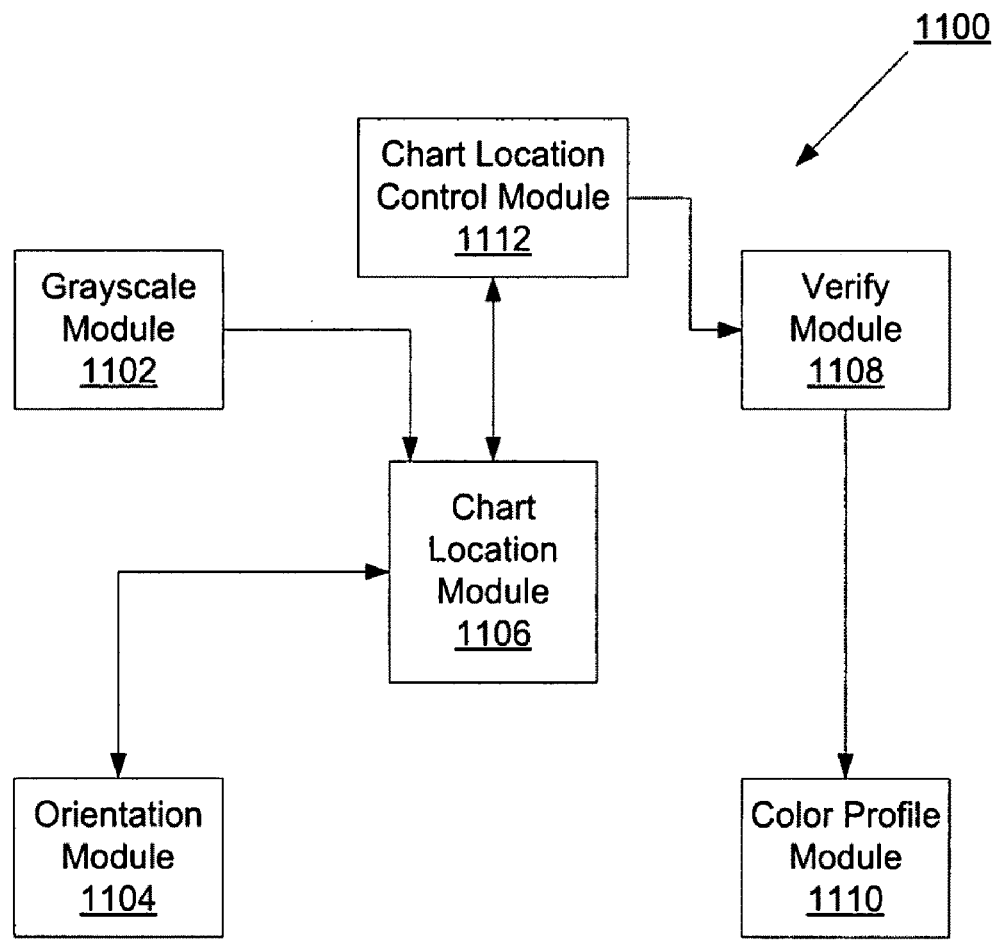
FIG. 11 is a block diagram illustrating a color chart location system according to one embodiment of the invention.

FIG. 2 illustrates an embodiment of a method to locate a color chart in an image. Furthermore, the method converts the image based on the maximum luminance of each pixel and orients the image in order to aid in the location of the color chart. FIG. 3 illustrates one embodiment of a method to convert the image based on the maximum luminance of each pixel. FIG. 5 illustrates one embodiment of a method to locate the color chart in an image based on average horizontal and vertical scan lines. FIG. 6AB illustrate fitting generated signals for a particular reference color chart to the horizontal and vertical scan lines. FIG. 8 illustrates orienting the image so that the color chart is horizontal. FIG. 11 illustrates one embodiment of the color chart location system that implements FIGS. 2, 3, 5, 6AB, and 8.

Figure 1:
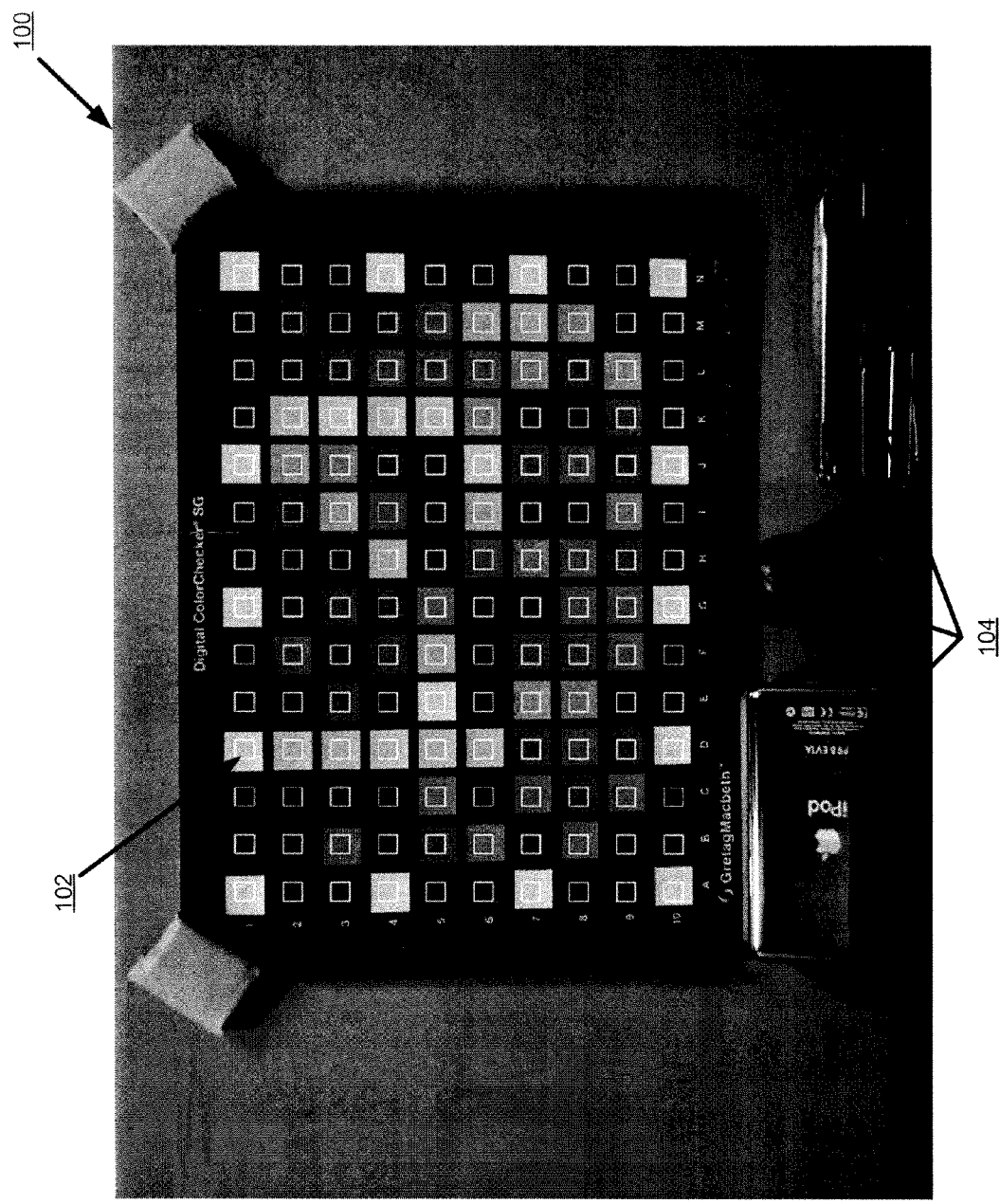
FIG. 1 is an image with an embedded color chart.

FIG. 1 is an image with an embedded color chart. In FIG. 1, image 100 comprises a color chart 102 and image subject matter 104. In one embodiment, an image is a digital image taken by a digital still camera. The image can be any one of the digital formats known in the art, such Graphics Interchange Format (GIF), Joint Photographics Experts Group (JPEG), RAW, etc. In an alternate embodiment, an image is a video frame. The video frame can be any digital video format known in the art, such as Moving Pictures Experts Group (MPEG), MPEG-4, etc. In a further embodiment, an image can be can be directly acquired from the camera, where there is no file format at all because the image is not written to a file. Image subject matter 104 is a music player, block objects and a tool. In alternate embodiment, image subject matter can be any type of subject matter typically taken by a camera or other color reproduction system. Color chart 102 comprises a grid of color squares used to calibrate the captured image. Each square is a known color. In one embodiment, the known color for each color square is represented by Red Green Blue (RGB) value. In alternate embodiments, the known color is represented by other color schemes known in the art, e.g. Cyan, Magenta, Yellow, and Black (CMYK), Cyan, Magenta, Yellow, Green (CMYG), etc.

In the embodiment illustrated in FIG. 1, color chart comprises ten by fourteen color squares. In alternate embodiments, color charts can have differing numbers of color squares, such six by eight, twenty by twelve, etc. Furthermore, color chart 102 can be oriented horizontal with the image border or be tilted at an angle to the image border.

FIG. 2 is a flow chart of one embodiment of a method 200 to detect an embedded color chart in an image and create a color profile for that image. Locating a color chart can be a five dimensional search because of the need to search in the x and y image dimension, chart size (width and height) and chart angle. Method 200 reduces the search to two dimensional search by fixing the orientation of the color chart to be horizontal and locating the color chart using horizontal and vertical average scan lines. The new search space is all angles, all x-start positions and widths and all y-positions and heights, which is a two dimensional search. Reducing the search to a two dimensional search enables the search to be done by a modern personal computer is a matter of seconds using the central processing unit (CPU) or graphics processing unit (GPU) of that computer. In one embodiment, color charts are located in the images as the images are being loaded onto the personal computer.

In FIG. 2, at block 202, method 200 converts that image to grayscale. In one embodiment, method 200 converts the image to grayscale by selecting the maximum RGB value for the each pixel. This increases the contrast between the background of the color chart and the squares of the color chart. A greater contrast, as shown below, enables easier detection of the color squares in the color chart. Because color charts typically have a black background, selecting the maximum RGB value gives the greatest luminance value for that pixel. A lager luminance value leads to a greater contrast between the black background and the pixel of the color square. Converting an image using the maximum RGB value is further described in FIG. 3, below. In an alternative embodiment, method 200 converts the image to grayscale based on the average luminance value for each pixel.

At block 204, method 200 fixes the orientation of the image such that the color chart is spatially horizontal, such that the sides of the color chart are parallel to the image frame. The color chart may not be in a perfect horizontal orientation relative to the borders of the pictures. In one embodiment, method 200 determines the orientation angle of the color chart by plotting a histogram of the edge angles in the image. The orientation angle can be a small angle such that the color chart is tilted slightly or large in the case where the color chart is heavily tilted. Method 200 rotates the image by the orientation angle to fix the orientation. Fixing the orientation results in the color chart being right side up or upside down. Fixing the orientation of the image is further described in FIG. 8, below.

Method 200 further executes a processing loop (blocks 206-212) to locate a particular reference color chart (N×M color chart) in the image. At block 208, method 200 searches for a particular N×M chart in the image. N refers to the number of color square columns in the color chart and M is the number of color square rows. As stated above, color charts are typically industry standard charts, comprising known dimensions, and number and type of color squares.

At block 210, method 200 determines if the N×M color chart is located. Locating a color chart is further described in FIG. 5, below. In one embodiment, method locates the color chart that is horizontal. In another embodiment, method 200 locates the color chart if the color chart is upside down. If method 200 does not locate the N×M color chart, method 200 selects another reference color chart to search for. The processing loop ends at block 212. If no chart is found or the located chart is too small, method 200 ends the search for an embedded color chart in the image at block 214. Alternatively, if the located chart is too small, method 200 can reject the color chart and search for the chart in part of the image. In one embodiment, method 200 searches for the color chart in overlapping chunks of the image if the color chart is less than one-eighth the area of the image.

If method 200 has located the N×M color chart, method 200 verifies this chart at block 216. In one embodiment, verification consists of checking the located color chart for the correct number, arrangement and type of color squares. Alternatively, method 200 is to build a color profile using the found chart and check if the color matrix is roughly diagonal. Method 200 optionally prompts the user to calibrate this image using the found color chart at block 218. At block 220, method 200 uses the located color chart to create a color profile for the image. In one embodiment, a color profile, as is known in the art, can be used to calibrate a sensor such as one typically found in a camera, video camera, scanner, printer, etc. Alternatively, the color profile is used to calibrate the sensor for specific lighting conditions (for example, as during a photo shoot). In an alternate embodiment, the color profile is used to calibrate a sequence of images, such as a group of photos taken of the same scene or photo session. In another embodiment, the color profile is used to calibrate a series of video frames. The video frames can be from the same or different scene. In a further embodiment, the color profile can be used to calibrate color reproduction equipment, such as cameras, video cameras, printers, scanners, copiers, etc.

FIG. 3 is a flow chart of one embodiment of method 300 to convert the image to grayscale based on the maximum luminance for pixel. Method 300 further executes a processing loop (blocks 302-308) to set each pixel to the maximum luminance value. At block 304, method 300 finds the maximum RGB value. In one embodiment, method 300 selects the largest pixel value of the three RGB components. Method 300 sets all three components to the found maximum at block 306. The processing loop ends at block 308.

Figure 4:
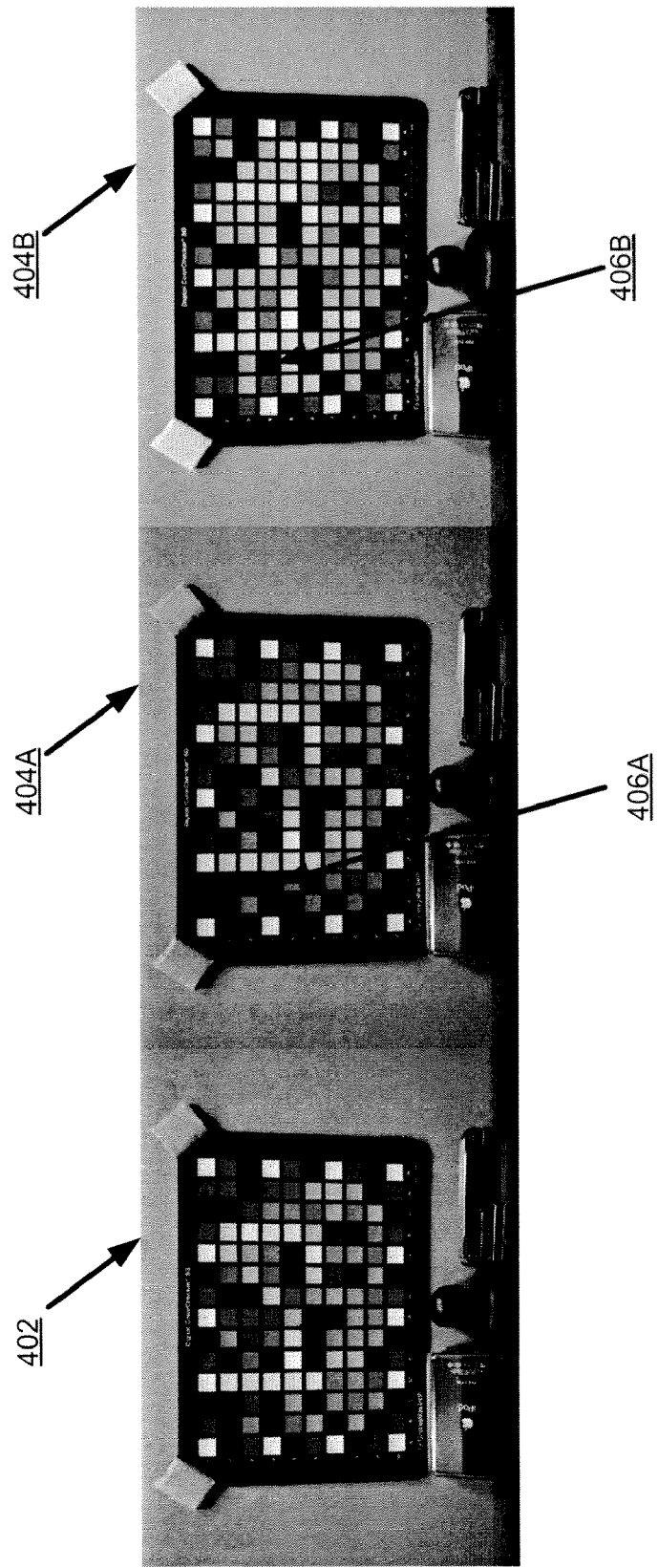
FIG. 4 illustrates one embodiment of a conversion of an image to grayscale based on the maximum luminance of each pixel.

FIG. 4 illustrates one embodiment of a conversion of image to grayscale based the maximum luminance. As stated above, method 300 converts the image to grayscale using two embodiments: one embodiment selects the luminance based on the average RGB value, whereas the other embodiment selects the luminance based on the maximum RGB value. In FIG. 4, the two grayscale images 404A-B are generated from color image 402 using the two embodiments. Image 404B exhibits greater contrast in the color chart between the color chart's black background and the square. For example, color square 406B is lighter than square 406A, which gives a greater contrast between the color square and the black background. On other words, color square 406A has less luminance than color square 406B. A greater luminance for color square 406B facilitates easier detection of the color square 406B, and thus, making it easier to locate the color chart embedded in the image.

FIG. 5 is a flow chart of one embodiment of a method 500 to locate a color chart embedded in an image. In FIG. 5, at block 502, method 500 computes an average horizontal scan line. In one embodiment, each point on the horizontal scan line is the average luminance of a horizontal scan line for the whole image. On one hand, because the background of the color chart is black, an average luminance of a horizontal scan line across the black background is small. On the other hand, since the most of the color squares in a row of a typical color chart are not black, the average luminance value for a scan line across a row of color squares is larger than the luminance for the black background. Thus, the average horizontal scan line will have peaks at position associated with the color squares and valleys associated with the color chart background. A higher contrast produces sharper peaks.

Method 500 fits a known pulse signal of the N×M color chart to the average horizontal and vertical scan lines by locating the horizontal and vertical positions of the color chart and fitting the pulses sequences of peaks and valleys from the average horizontal and vertical scan lines with generated pulse signals corresponding to a reference color chart. Method 500 further executes a first processing loop (blocks 504-522) to determine if there is a pulse representing rows of color squares in an embedded color chart in the image. At block 506, method 500 finds the next start position. In one embodiment, the next start position is the next pixel on the average horizontal scan line. In an alternate embodiment, a suitable scheme to known in the art to locate another point on a line can be employed.

At block 508, method 500 attempts to fit M pulses of the average horizontal scan line onto a generated signal. The M pulses represent M rows of the reference color chart and the generated signal is a signal that represents average horizontal scan line for the reference color chart. In one embodiment, method 500 fits the M pulses onto the generate signal by matching the number of pulses in generated signal with the number of pulses in the average horizontal scan line. In an alternate embodiment, method 500 fits M pulses onto a generated signal as further described in FIG. 6A below.

At block 510, method 500 determines if the vertical fit is successful. In one embodiment, method 500 compares the sum of the goodness values is greater than a threshold. In one embodiment, the threshold is an empirical threshold. The determination of the goodness values for the average horizontal scan lines is further described at FIG. 6A below. If the vertical fit was not successful, method 500 proceeds to the end of the loop at 522.

It the vertical fit was successful, the location of the fit sets the top and bottom horizontal position of the color chart in the image. Locating the left and right vertical positions of the color chart can be accomplished by searching a reduced image bounded by the top and bottom horizontal positions determined above. Method 500 computes a reduced average vertical scan line at block 512. In one embodiment, the reduced average vertical scan line is determined by computing the average luminance along a vertical scan line of the image in between the top and bottom horizontal determined above. By computing the reduce average vertical scan line, the difference between the pulse peaks and valleys in the reduced average vertical scan lines can be more pronounced that for the average horizontal scan lines because there is less luminance contribution due to pixels that are not part of the color chart in the reduced image. Thus, the area above and below the chart can be excluded from computing the average vertical scan lines.

Method 500 further executes a second processing loop (blocks 514-522) to determine if there is a pulse representing rows of color squares in an embedded color chart in the image. At block 516, method 500 finds the next start position. In one embodiment, the next start position is the next pixel on the average horizontal scan line. In an alternate embodiment, a suitable scheme to known in the art to locate another point on a line can be employed. Furthermore, method 500 does not need to search over all possible pulse widths. In one embodiment, the height of the color chart and the peaks method 500 is searching for are roughly square. In this embodiment, method 500 searches for pulse widths that roughly comparable to the determined pulse height of the color chart.

At block 518, method 500 attempts to fit N pulses of the average vertical scan line onto a generated signal. The N pulses represent N columns of the reference color chart. The generated signal is a signal that represents average vertical scan line for the reference color chart. In one embodiment, method 500 fits the N pulses onto the generated signal by matching the number of pulses in generated signal with the number of pulses in the average vertical scan line. In an alternate embodiment, method 500 fits N pulses onto a generate signal as further described in FIG. 6B below.

As block 520, method 500 determines if the horizontal fit is successful. In one embodiment, method 500 compares if the sum of the goodness values is greater than a threshold. The determination of the goodness values for the average horizontal scan lines is further described at FIG. 6B below. If the horizontal fit was not successful, method 500 proceeds to the end of the loop at 522. The second processing loop ends at block 522.

If the horizontal fit was successful, a color chart was found and control proceeds to block 216. If no color chart is found, control proceeds to block 212.

FIG. 6A is a flow chart of one embodiment of a method 600 to measure the fit of M pulses from the average horizontal scan line onto a vertical generated signal. In FIG. 6A, method 600 executes a processing loop (blocks 602-608) to fit M pulses onto the vertical generated signal. At block 604, method 600 scales the generated signal to a mean value of zero and a standard deviation of one. Method 600 derives goodness values for each pulse to measure the fit of the M pulses to the generated signal. In one embodiment, the goodness value is the average of the side form the average of the top of the peak. A difference between the top of the peak and the side of the peak measures the contrast between the areas that are supposed to be dark (low contrast) with the areas that are supposed to be bright (the color square). The processing loop ends at block 608. At block 610, method 600 sums the M pulse goodness values. The sum of the goodness values is used to measure the fit of the M pulses to the vertical generated signal. This sum is used, in FIG. 5, at block 510, to determine if there is a proper fit of the M pulses onto the generated signal.

Figure 6B:
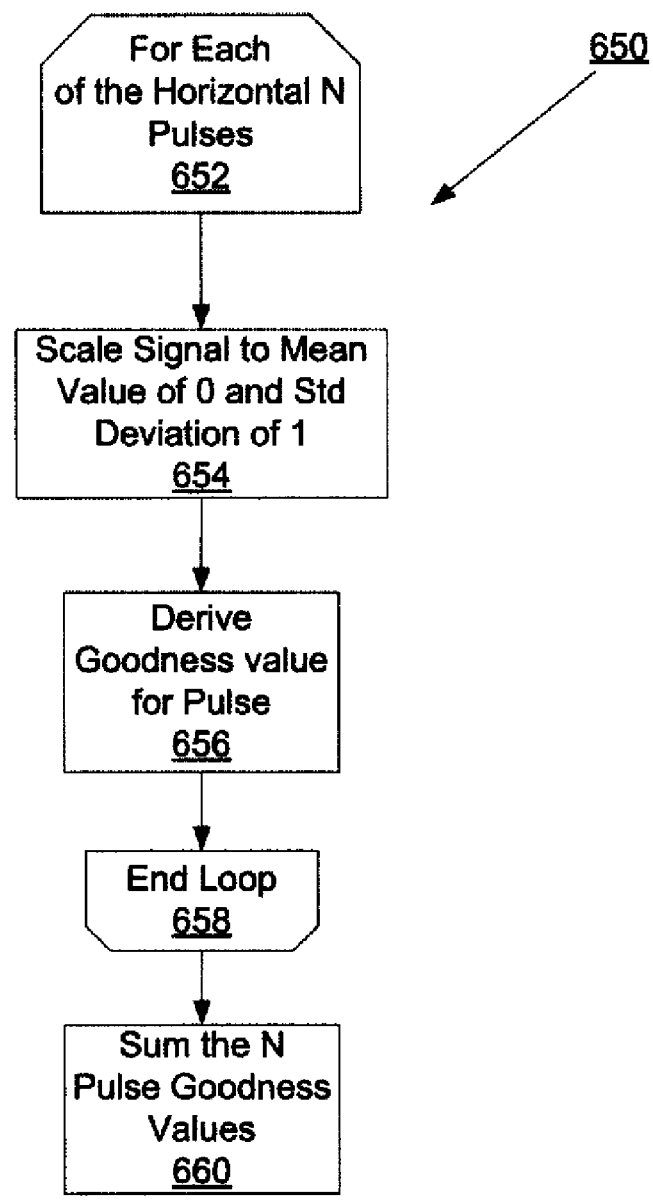
FIG. 6B is a flow chart of one embodiment of a method to measure the fit of N pulses onto a horizontal generated signal.

FIG. 6B is a flow chart of one embodiment of a method 650 to measure the fit of N pulses from the average vertical scan line onto a horizontal generated signal. In FIG. 6B, method 650 executes a processing loop (blocks 652-658) to fit N pulses onto the horizontal generated signal. At block 654, method 650 scales the generated signal to a mean value of zero and a standard deviation of one. Method 650 derives goodness values for each pulse to measure the fit of the N pulses to the generated signal. In one embodiment, the goodness value is the average of the side form the average of the top of the peak. A difference between the top of the peak and the side of the peak measures the contrast between the areas that are supposed to be dark (low contrast) with the areas that are supposed to be bright (the color square). The processing loop ends at block 658. At block 660, method 650 sums the N pulse goodness values. The sum of the goodness values is used to measure the fit of the M pulses to the vertical generated signal. This sum is used, in FIG. 5, at block 520, to determine if there is a proper fit of the N pulses onto the generated signal.

Figure 7A:
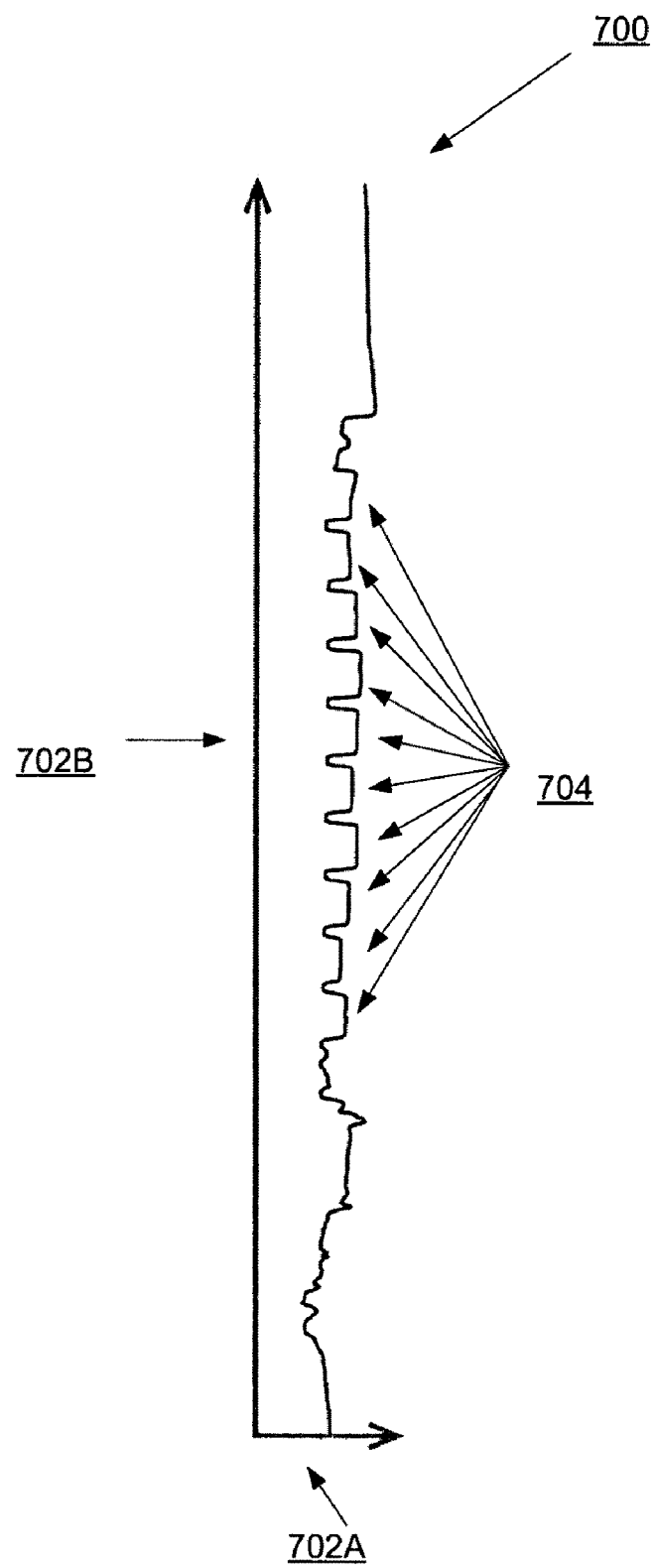
FIG. 7A is a graph of one embodiment illustrating a plot of an average horizontal scan lines comprising M pulses.

FIG. 7A is a graph 700 of one embodiment illustrating a plot of an average horizontal scan lines comprising M pulses. In FIG. 7, graph 700 the average horizontal scan line plotted along X-axis 702A and Y-axis 702B. On the X-axis 702A, graph 700 plots the luminance value. On the Y-axis 702B, graph 700 plots the horizontal scan line position. Graph 700 illustrates ten pulses 704 in the middle of the graph. These ten pulses represent the ten rows of the color chart embedded in the image. As described in FIG. 5 above, method 500 locates the pulses in the average horizontal scan line.

Figure 7B:
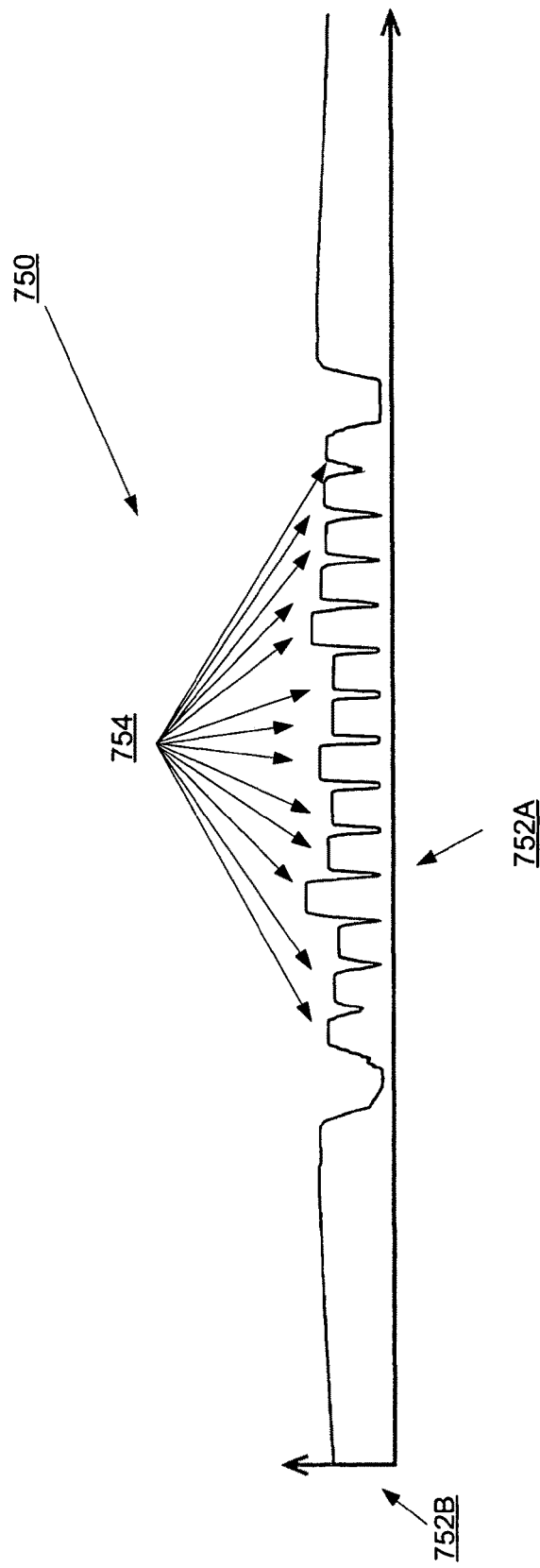
FIG. 7B is a graph of one embodiment illustrating a plot of an average horizontal scan lines comprising N pulses.

FIG. 7B is a graph 750 of one embodiment illustrating a plot an average vertical scan lines comprising N pulses. In FIG. 7, graph 750 is an example of an average vertical scan line plotted along X-axis 752A and Y-axis 752B. On the X-axis 752A, graph 750 plots the luminance value. On the Y-axis 752B, graph 750 plots the vertical scan line position. Graph 750 illustrates fourteen pulses 754 in the middle of the graph. These ten pulses represent the fourteen columns of the color chart embedded in the image. As described in FIG. 5 above, method 500 locates the pulses in the average vertical scan line.

Figure 9:
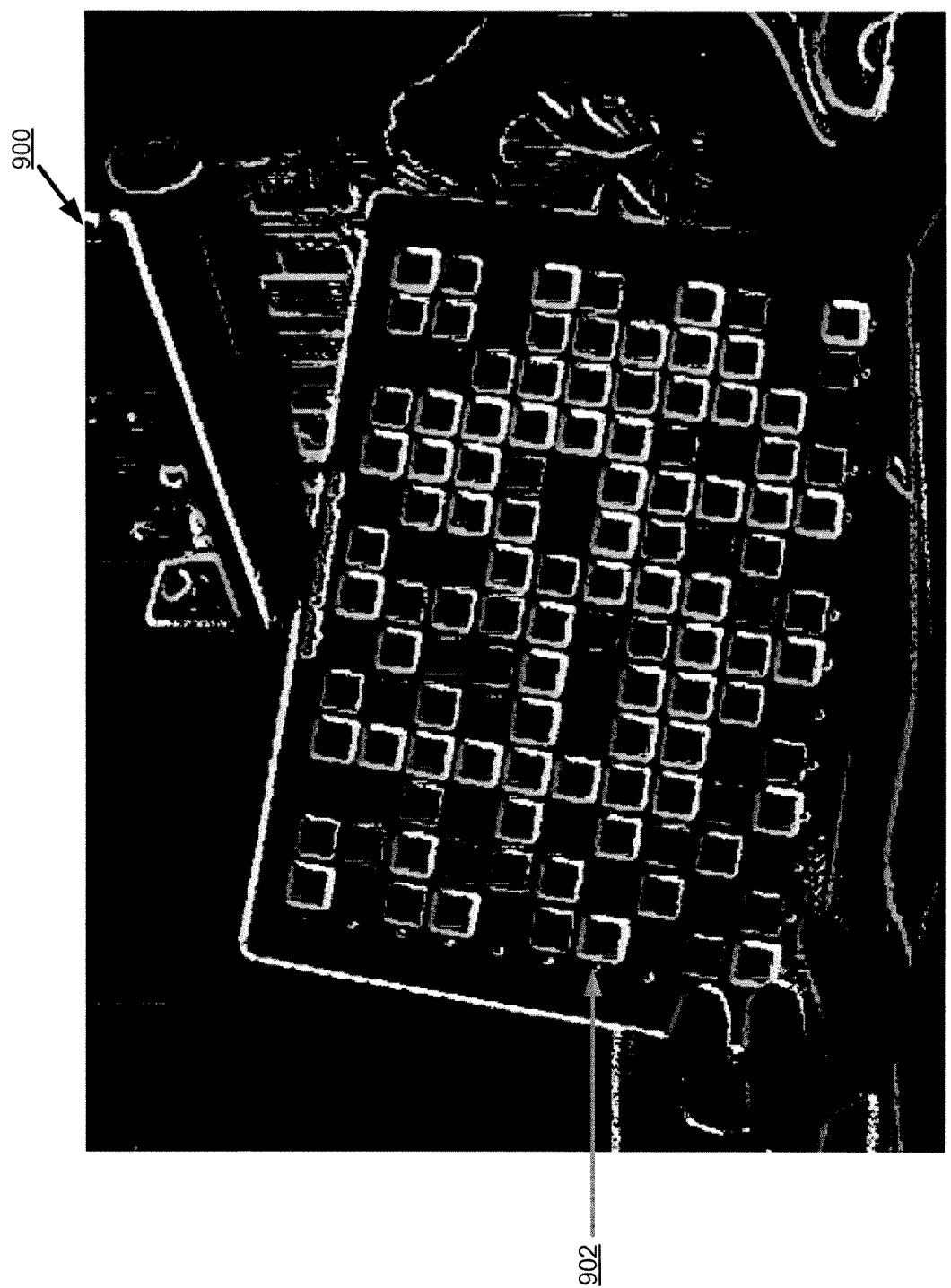
FIG. 9 illustrates one embodiment of converted image illustrating edges.

FIG. 8 is a flow chart of one embodiment of a method to fix the orientation of the image. While this embodiment of method 800 describes fixing the orientation of an image based on an embedded color chart, in alternate embodiments, method 800 can be used to fix the orientation of an image that has strong horizontal and/or vertical edges (e.g., scanned text, etc.). In FIG. 8, at block 802, method 800 performs edge detection in the image according to one several schemes known in the art. While in one embodiment method 800 performs Sobel edge detection, in alternate embodiments, method 800 performs different edge detections as know in the art (Abdou, Prewitt, etc.). FIG. 9 illustrates one embodiment of converted image illustrating edges. In FIG. 9, image 900 comprises a color chart 902, as illustrated by the edges of the color squares in the color chart.

Returning to FIG. 8, at block 804, method 800 finds the edges in the image and measures the angle of the gradient vector for the each edge. The gradient vector comes from the chosen gradient operator method 800 uses as described at block 802. In one embodiment, if the vector is small, method 800 ignores this edge for the analysis. Method 800 measures the angle of the vector. In one embodiment, method 800 measures the angle of the vector to the horizontal of the image. Method 800 creates an image of the vector angles at block 806.

Figure 10:
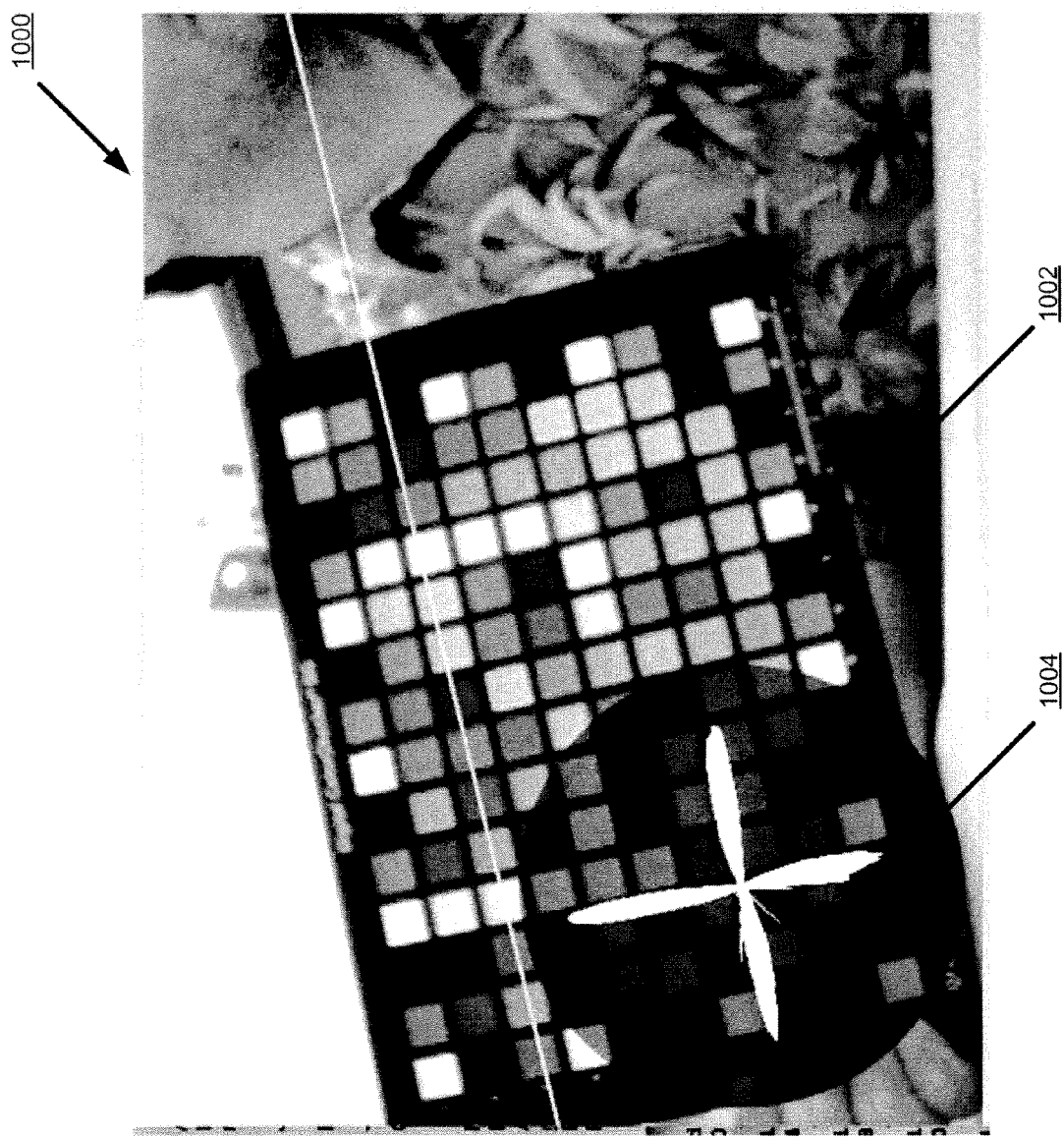
FIG. 10 illustrates one embodiment of an angle histogram overlaid on an image with an embedded color chart.

At block 808, method 800 creates a histogram of the vector angle image. The histogram clusters vector angles along peaks of the histogram that are related to the orientation angle of the color chart. FIG. 10 illustrates one embodiment of an angle histogram overlaid on an image with an embedded color chart. In FIG. 10, images 1000 comprises color chart 1002 oriented at an angle to the horizontal of the image. Overlaid on image 1000 is the histogram 1004 that shows four spikes of the histogram correlating to the angle of the color chart.

Returning to FIG. 8, at block 810, method 800 reduces the histogram to one spike. In one embodiment, method 800 reduces the histogram to one spike by taking, for each angle $\alpha$ in the histogram between 0 and $\pi/4$, the minimum value of the histogram at $\alpha$, $\alpha+\pi/4$, $\alpha+2\pi/4$, $\alpha+3\pi/4$. If there is noise in the histogram, method 800 blurs the histogram to smooth out the noisy signal. At block 812, method 800 selects the angle where the reduced histogram has the maximal value. This angle represents the orientation angle of the color chart in reference to the horizontal of the image.

FIG. 11 is a block diagram illustrating a color chart location system 1100 according to one embodiment of the invention. In FIG. 11, system 1100 comprises grayscale module 1102, orientation module 1104, chart location module 1106, verify module 1108, color profile 1110, and chart location control module 1112. Grayscale module 1102 couples to chart location module 1106 and converts the original image into a grayscale based on the maximum luminance of each image pixel as described at FIG. 2, block 202 and FIG. 3 above. Orientation module 1104 couples to chart location module 1106 and determines the orientation angle of the embedded color chart as described at FIG. 2, block 204 and FIG. 8. Orientation module further fixes the orientation of the color chart as described at FIG. 2, block 204 and FIG. 8. Chart location module 1106 further couples to chart location control module 1112 and locates the color chart in the image using average horizontal and vertical scan lines as described at FIG. 2, blocks 208-210 and FIG. 5. Chart location control module 1112 couples to the verify module and controls the chart location system 1100, in part, by selecting which reference color chart location module 1106 searches for as described at FIG. 2', block 206. Verify module 1108 further couples to color profile module 1110 and verifies the located color chart as described at FIG. 2, block 216. Color profile module 1110 develops a color profile based on the located color chart as described at FIG. 2, bock 220.

In practice, the methods described herein may constitute one or more programs made up of machine-executable instructions. Describing the method with reference to the flowchart in FIGS. 2, 3, 5, 6AB, and 8 enables one skilled in the art to develop such programs, including such instructions to carry out the operations (acts) represented by logical blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 12:
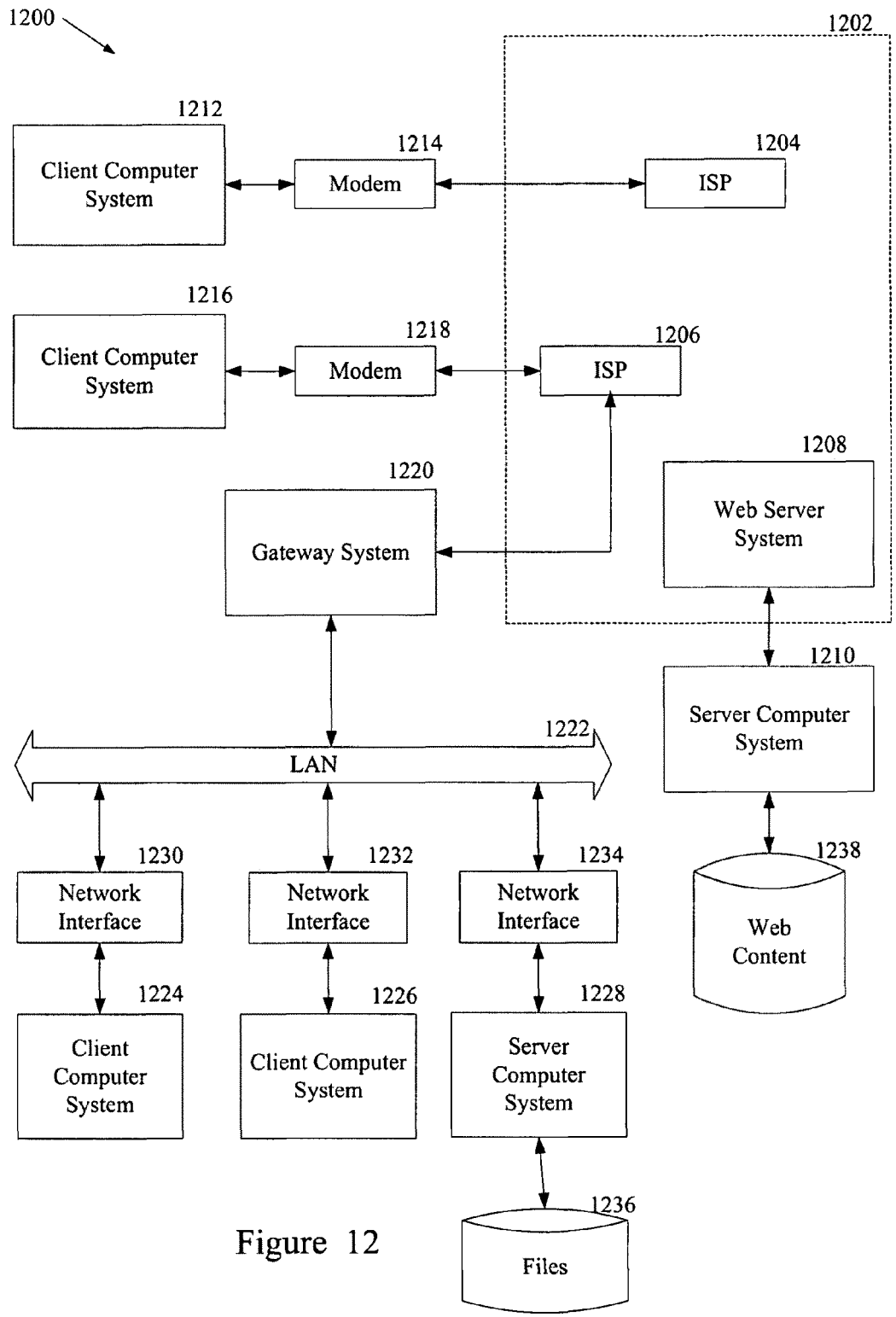
FIG. 12 is a diagram of one embodiment of an operating environment suitable for practicing the present invention.

FIG. 12 shows several computer systems 1200 that are coupled together through a network 1202, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1202 is typically provided by Internet service providers (ISP), such as the ISPs 1204 and 1206. Users on client systems, such as client computer systems 1212, 1216, 1224, and 1226 obtain access to the Internet through the Internet service providers, such as ISPs 1204 and 1206. Access to the Internet allows users of the client computer systems to exchange information, receive and send e-mails, and view documents, such as documents which have been prepared in the HTML format. These documents are often provided by web servers, such as web server 1208 which is considered to be "on" the Internet. Often these web servers are provided by the ISPs, such as ISP 1204, although a computer system can be set up and connected to the Internet without that system being also an ISP as is well known in the art.

The web server 1208 is typically at least one computer system which operates as a server computer system and is configured to operate with the protocols of the World Wide Web and is coupled to the Internet. Optionally, the web server 1208 can be part of an ISP which provides access to the Internet for client systems. The web server 1208 is shown coupled to the server computer system 1210 which itself is coupled to web content 1238, which can be considered a form of a media database. It will be appreciated that while two computer systems 1208 and 1210 are shown in FIG. 12, the web server system 1208 and the server computer system 1210 can be one computer system having different software components providing the web server functionality and the server functionality provided by the server computer system 1210 which will be described further below.

Client computer systems 1212, 1216, 1224, and 1226 can each, with the appropriate web browsing software, view HTML pages provided by the web server 1208. The ISP 1204 provides Internet connectivity to the client computer system 1212 through the modem interface 1214 which can be considered part of the client computer system 1212. The client computer system can be a personal computer system, a network computer, a Web TV system, a handheld device, or other such computer system. Similarly, the ISP 1206 provides Internet connectivity for client systems 1216, 1224, and 1226, although as shown in FIG. 12, the connections are not the same for these three computer systems. Client computer system 1216 is coupled through a modem interface 1218 while client computer systems 1224 and 1226 are part of a LAN. While FIG. 12 shows the interfaces 1214 and 1218 as generically as a "modem," it will be appreciated that each of these interfaces can be an analog modem, ISDN modem, cable modem, satellite transmission interface, or other interfaces for coupling a computer system to other computer systems. Client computer systems 1224 and 1226 are coupled to a LAN 1222 through network interfaces 1230 and 1232, which can be Ethernet network or other network interfaces. The LAN 1222 is also coupled to a gateway computer system 1220 which can provide firewall and other Internet related services for the local area network. This gateway computer system 1220 is coupled to the ISP 1206 to provide Internet connectivity to the client computer systems 1224 and 1226. The gateway computer system 1220 can be a conventional server computer system. Also, the web server system 1208 can be a conventional server computer system.

Alternatively, as well-known, a server computer system 1228 can be directly coupled to the LAN 1222 through a network interface 1234 to provide files 1236 and other services to the clients 1224, 1226, without the need to connect to the Internet through the gateway system 1220. Furthermore, any combination of client systems 1212, 1216, 1224, 1226 may be connected together in a peer-to-peer network using LAN 1222, Internet 1202 or a combination as a communications medium. Generally, a peer-to-peer network distributes data across a network of multiple machines for storage and retrieval without the use of a central server or servers. Thus, each peer network node may incorporate the functions of both the client and the server described above.

Figure 13:
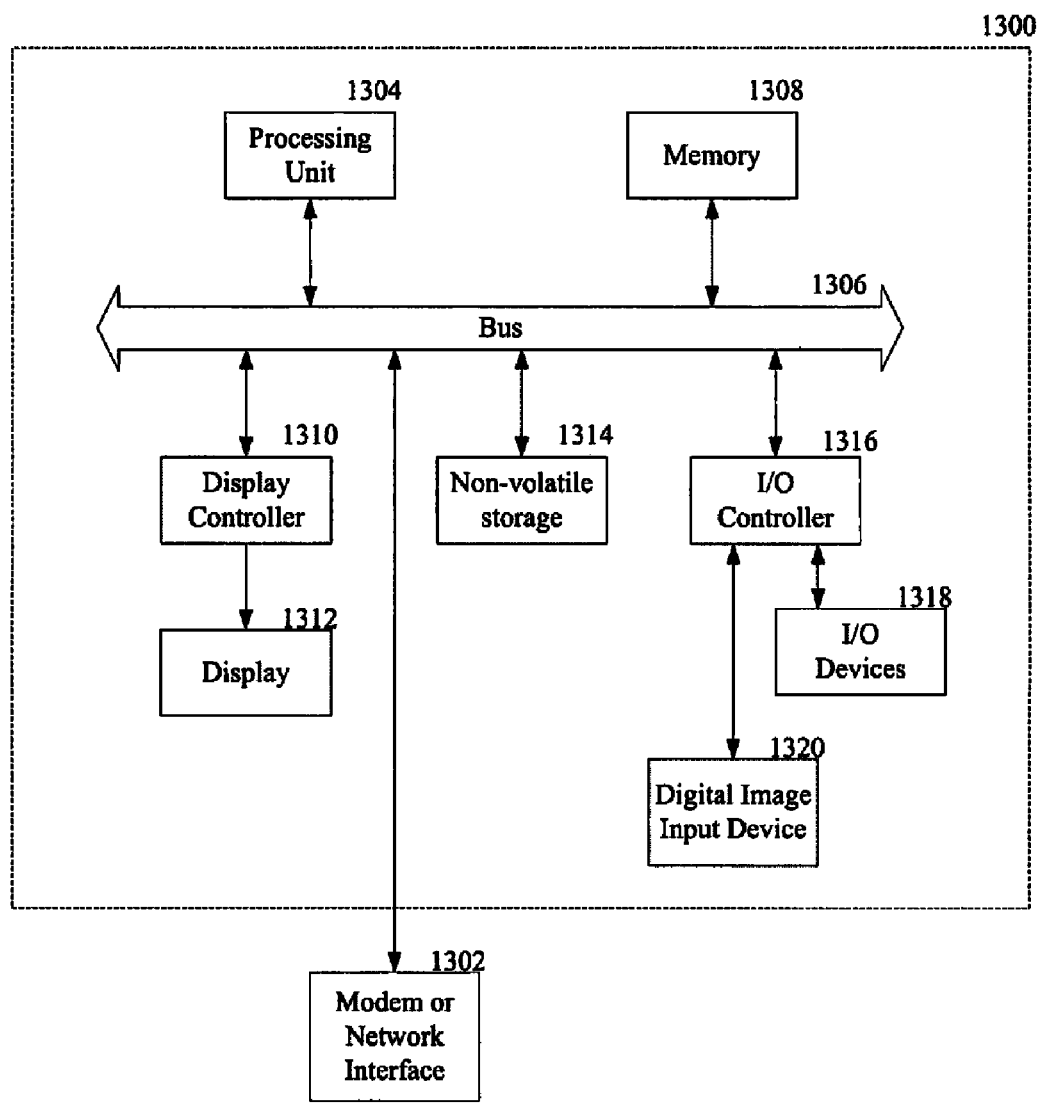
FIG. 13 a diagram of one embodiment of a data processing system, such as a general purpose computer system, suitable for use in the operating environment of FIG. 2.
Figure 1:
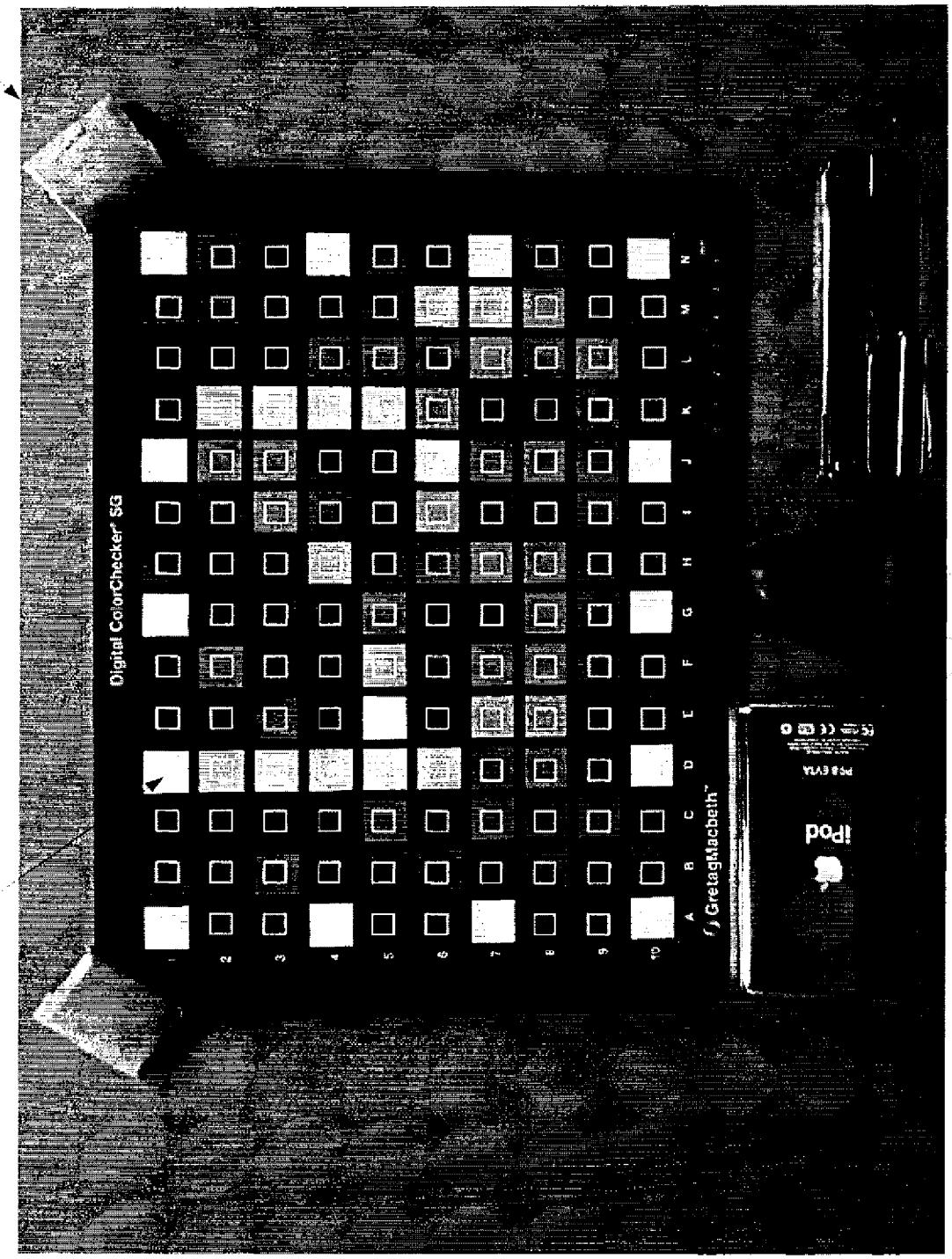
Figure 4:
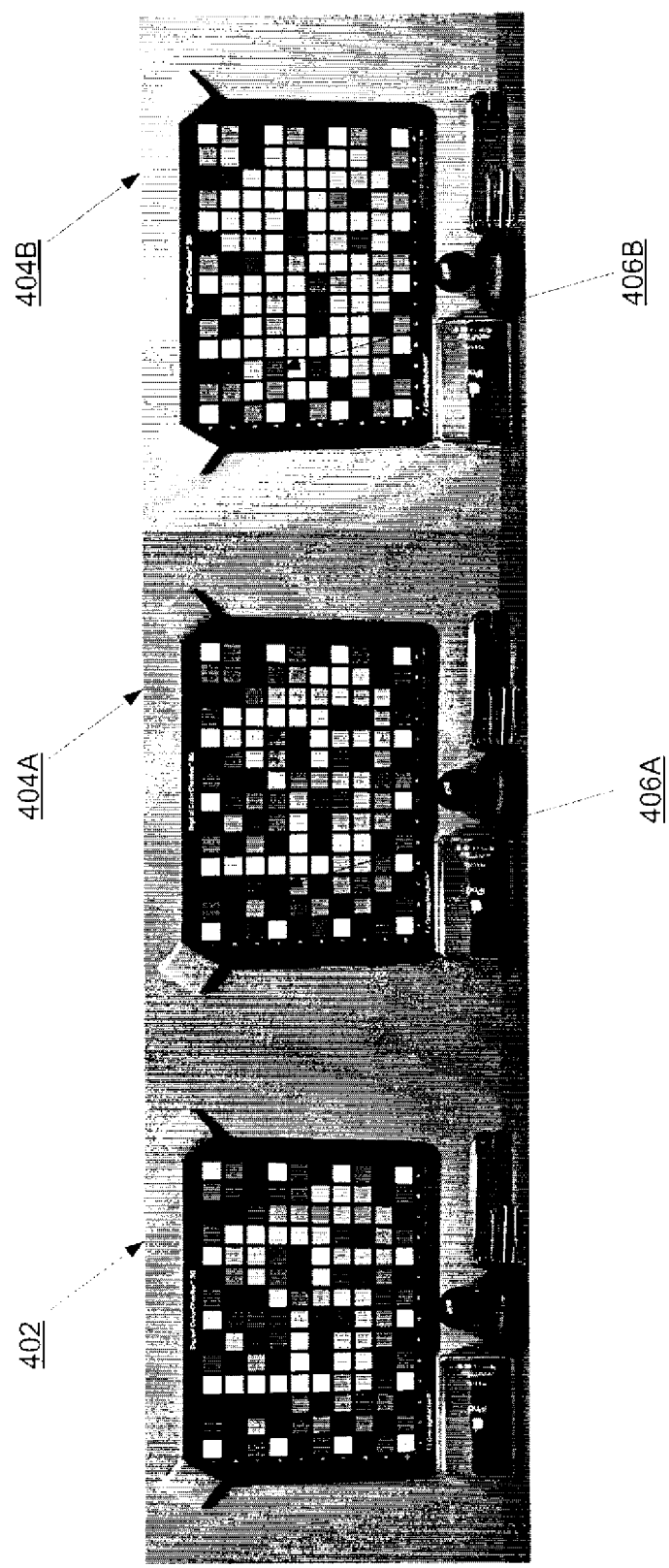
Figure 10:
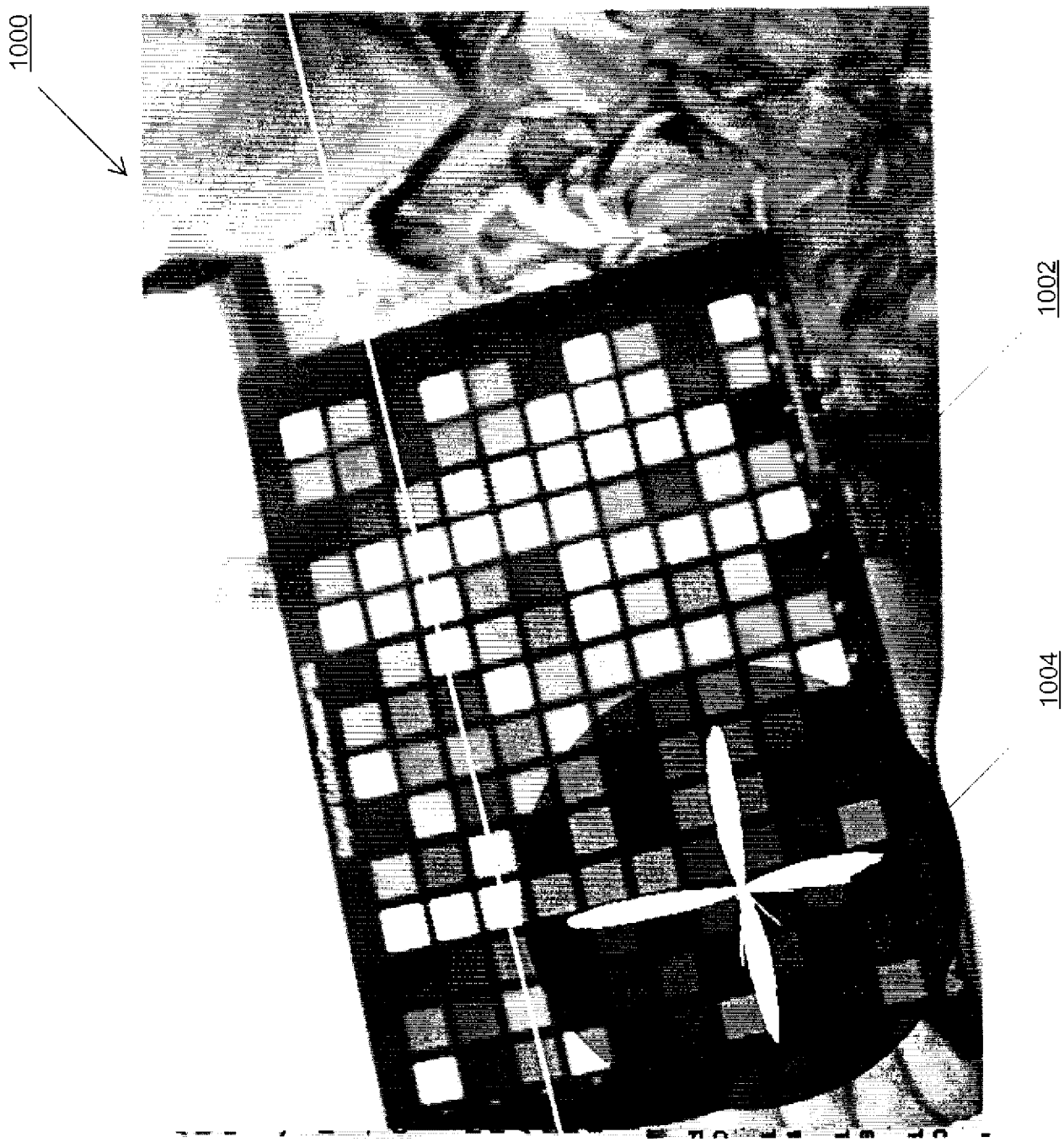

The following description of FIG. 13 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 13 shows one example of a conventional computer system that can be used in one or more aspects of the invention. The computer system 1300 interfaces to external systems through the modem or network interface 1302. It will be appreciated that the modem or network interface 1302 can be considered to be part of the computer system 1300. This interface 1302 can be an analog modem, ISDN modem, cable modem, token ring interface, satellite transmission interface, or other interfaces for coupling a computer system to other computer systems. The computer system 1300 includes a processing unit 1304, which can be a conventional microprocessor such as an Intel Pentium microprocessor or Motorola Power PC microprocessor. Memory 1308 is coupled to the processor 1304 by a bus 1306. Memory 1308 can be dynamic random access memory (DRAM) and can also include static RAM (SRAM). The bus 1306 couples the processor 1304 to the memory 1308 and also to non-volatile storage 1314 and to display controller 1310 and to the input/output (I/O) controller 1316. The display controller 1310 controls in the conventional manner a display on a display device 1312 which can be a cathode ray tube (CRT) or liquid crystal display (LCD). The input/output devices 1318 can include a keyboard, disk drives, printers, a scanner, and other input and output devices, including a mouse or other pointing device. The display controller 1310 and the I/O controller 1316 can be implemented with conventional well known technology. A digital image input device 1320 can be a digital camera which is coupled to an I/O controller 1316 in order to allow images from the digital camera to be input into the computer system 1300. The non-volatile storage 1314 is often a magnetic hard disk, an optical disk, or another form of storage for large amounts of data. Some of this data is often written, by a direct memory access process, into memory 1308 during execution of software in the computer system 1300. One of skill in the art will immediately recognize that the terms "computer-readable medium" and "machine-readable medium" include any type of storage device that is accessible by the processor 1304 or by other data processing systems such as cellular telephones or personal digital assistants or MP3 players, etc. and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1308 for execution by the processor 1304. A Web TV system, which is known in the art, is also considered to be a computer system according to the embodiments of the present invention, but it may lack some of the features shown in FIG. 13, such as certain input or output devices. A typical computer system will usually include at least a processor, memory, and a bus coupling the memory to the processor.

It will be appreciated that the computer system 1300 is one example of many possible computer systems, which have different architectures. For example, personal computers based on an Intel microprocessor often have multiple buses, one of which can be an input/output (I/O) bus for the peripherals and one that directly connects the processor 1304 and the memory 1308 (often referred to as a memory bus). The buses are connected together through bridge components that perform any necessary translation due to differing bus protocols.

It will also be appreciated that the computer system 1300 is controlled by operating system software, which includes a file management system, such as a disk operating system, which is part of the operating system software. One example of an operating system software with its associated file management system software is the family of operating systems known as MAC OS X from Apple Corporation in Cupertino, Calif., and their associated file management systems. The file management system is typically stored in the non-volatile storage 1314 and causes the processor 1304 to execute the various acts required by the operating system to input and output data and to store data in memory, including storing files on the non-volatile storage 1314.

It will be appreciated that computer system 1300 could be a camera, video camera, scanner, or any other type image acquisition system. In one embodiment, image acquisition system comprises a lens, image sensor or other hardware typically associated with a camera, video camera, or other type if image acquisition system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
   receiving an image, wherein the image comprises an embedded color calibration chart, the embedded color calibration chart comprising a constant color property background and a plurality of color blocks with a color property which varies relative to the constant color property background; and
   identifying the embedded color calibration chart without intervention of a user by identifying a difference in comparison between the constant color property background and at least one of the plurality of color blocks.

2. The computerized method of claim 1, further comprising:
   verifying the embedded color calibration chart.

3. The computerized method of claim 1, further comprising:
   creating a color profile for the image based on the embedded color calibration chart.

4. The computerized method of claim 1, wherein the color property is luminance.

5. A computerized method comprising:
   receiving an image, wherein the image comprises an embedded color calibration chart, the embedded color calibration chart comprising a constant color property background and a plurality of color blocks with a color property, which varies relative to the constant color property background;
   locating the embedded color calibration chart without intervention of a user by identifying a difference in comparison between the constant color property background and at least one of the plurality of color blocks;
   verifying the embedded color calibration chart; and
   creating a color profile for the image based on the embedded color calibration chart.

6. The computerized method of claim 5, wherein the locating further comprises:
   computing an average horizontal scan line comprising a first set of pulses;
   fitting a second set of generated pulses corresponding to a reference color calibration chart to the first set of pulses;
   determining if the first set of pulses matches the second set of generated pulses;
   computing an average vertical scan line comprising a third set of pulses;
   fitting a fourth set of generated pulses corresponding to a reference color calibration chart to the third set of pulses;
   determining if the third set of pulses matches the fourth set of generated pulses; and
   determining the location of the embedded color calibration chart in the image based on the first and third set of pulses.

7. The computerized method of claim 6, wherein said fitting a second set of generated pulses to a first set of pulses comprises matching a number of pulses in the second set of generated pulses to the first set of pulses.

8. The computerized method of claim 6, wherein the fitting a second set of pulses comprises:
   scaling the signal of each pulse in the first set of pulses to a mean value of zero and standard deviation of one;
   deriving a goodness value for the each pulse of the first set of pulses by comparing the each pulse of the first set with a corresponding pulse of the second set of pulses;
   summing the goodness values associated with the each pulse of the first set of pulses; and
   determining if the summed goodness values is greater than a threshold.

9. The computerized method of claim 6, wherein the fitting a fourth set of pulses comprises:
   scaling the signal of each pulse in the third set of pulses to a mean value of zero and standard deviation of one;
   deriving a goodness value for the each pulse of the third set of pulses by comparing the each pulse of the third set with a corresponding pulse of the fourth set of pulses;
   summing the goodness values associated with the each pulse of the third set of pulses; and
   determining if the summed goodness values is greater than a threshold.

10. The computerized method of claim 5, further comprising:
    converting the image to grayscale based on a maximum luminance of each pixel in the image.

11. The computerized method of claim 5, wherein the image is selected from the group of a digital image and a video frame.

12. The computerized method of claim 5, further comprising:
    calibrating the image with the color profile.

13. A non-transitory machine-readable media having executable instructions to cause a processor to perform a method comprising:
- receiving an image, wherein the image comprises an embedded color calibration chart, the embedded color calibration chart comprising a constant color property background and a plurality of color blocks with a color property which varies relative to the constant color property background; and
- identifying the embedded color calibration chart without intervention of a user by identifying a difference in comparison between the constant color property background and at least one of the plurality of color blocks.

14. The non-transitory machine-readable media of claim 13, further comprising:
- verifying the embedded color calibration chart.

15. The non-transitory machine-readable media of claim 13, further comprising:
- creating a color profile for the image based on the embedded color calibration chart.

16. A non-transitory machine-readable media having executable instructions to cause a processor to perform a method comprising:
- receiving an image, wherein the image comprises an embedded color calibration chart, the embedded color calibration chart comprising a constant color property background and a plurality of color blocks with a color property, which varies relative to the constant color property background;
- locating the embedded color calibration chart without intervention of a user by identifying a difference in comparison between the constant color property background and at least one of the plurality of color blocks;
- verifying the embedded color calibration chart; and
- creating a color profile for the image based on the embedded color calibration chart.

17. The non-transitory machine-readable media of claim 16, further comprising:
- computing an average horizontal scan line comprising a first set of pulses;
- fitting a second set of generated pulses corresponding to a reference color calibration chart to the first set of pulses;
- determining if the first set of pulses matches the second set of generated pulses;
- computing an average vertical scan line comprising a third set of pulses;
- fitting a fourth set of generated pulses corresponding to a reference color calibration chart to the third set of pulses; and
- determining if the third set of pulses matches the fourth set of generated pulses; and
- determining the location of the embedded color calibration chart in the image based on the first and third set of pulses.

18. An apparatus comprising:
- means for receiving an image, wherein the image comprises an embedded color calibration chart, the embedded color calibration chart comprising a constant color property background and a plurality of color blocks with a color property, which varies relative to the constant color property background;
- means for locating the embedded color calibration chart without intervention of a user with means for identifying a difference in comparison between the constant color property background and at least one of the plurality of color blocks;
- means for verifying the embedded color calibration chart; and
- means for creating a color profile for the image based on the embedded color calibration chart.

19. The apparatus of claim 18, further comprising:
- means for computing an average horizontal scan line comprising a first set of pulses;
- means for fitting a second set of generated pulses corresponding to a reference color calibration chart to the first set of pulses;
- means for determining if the first set of pulses matches the second set of generated pulses;
- means for computing an average vertical scan line comprising a third set of pulses;
- means for fitting a fourth set of generated pulses corresponding to a reference color calibration chart to the third set of pulses; and
- means for determining if the third set of pulses matches the fourth set of generated pulses; and
- means for determining the location of the embedded color calibration chart in the image based on the first and third set of pulses.

20. The apparatus of claim 19, wherein said fitting a second set of generated pulses to a first set of pulses comprises matching a number of pulses in the second set of generated pulses to the first set of pulses.

21. The apparatus of claim 19, wherein the fitting a second set of pulses comprises:
- means for scaling the signal of each pulse in the first set of pulses to a mean value of zero and standard deviation of one;
- means for deriving a goodness value for the each pulse of the first set of pulses by comparing the each pulse of the first set with a corresponding pulse of the second set of pulses;
- means for summing the goodness values associated with the each pulse of the first set of pulses; and
- means for determining if the summed goodness values is greater than a threshold.

22. The apparatus of claim 19, wherein the fitting a fourth set of pulses comprises:
- means for scaling the signal of each pulse in the third set of pulses to a mean value of zero and standard deviation of one;
- means for deriving a goodness value for the each pulse of the third set of pulses by comparing the each pulse of the third set with a corresponding pulse of the fourth set of pulses;
- means for summing the goodness values associated with the each pulse of the third set of pulses; and
- means for determining if the summed goodness values is greater than a threshold.

23. The apparatus of claim 18, further comprising:
- means for converting the image to grayscale based on a maximum luminance of each pixel in the image.

24. The apparatus of claim 18, wherein the image is selected from the group of a digital image and a video frame.

25. A system comprising:
- a processor;
- a memory coupled to the processor through a bus; and
- a process executed from memory by the processor to cause the processor to receive an image, wherein the image comprises an embedded color calibration chart, the embedded color calibration chart comprising a constant color property background and a plurality of color blocks with a color property which varies relative to the constant color property background, to locate the embedded color calibration chart without intervention of a user by identifying a difference in comparison between the constant color property background and at least one of the plurality of color blocks, to verify the embedded color calibration chart, and to create a color profile for the image based on the embedded color calibration chart.

26. The system of claim 25, wherein the process further causes the processor to compute an average horizontal scan line comprising a first set of pulses, to fit a second set of generated pulses corresponding to a reference color calibration chart to the first set of pulses, to determine if the first set of pulses matches the second set of generated pulses, to compute an average vertical scan line comprising a third set of pulses, to fit a fourth set of generated pulses corresponding to a reference color calibration chart to the third set of pulses, to determine if the third set of pulses matches the fourth set of generated pulses, and to determine the location of the embedded color calibration chart in the image based on the first and third set of pulses.

27. The system of claim 26, wherein said to fit a second set of generated pulses to a first set of pulses comprises matching a number of pulses in the second set of generated pulses to the first set of pulses.

28. The system of claim 26, wherein the process further causes the processor to scale the signal of each pulse in the first set of pulses to a mean value of zero and standard deviation of one, to derive a goodness value for the each pulse of the first set of pulses by comparing the each pulse of the first set with a corresponding pulse of the second set of pulses, to sum the goodness values associated with the each pulse of the first set of pulses, and to determine if the summed goodness values is greater than a threshold.

29. A camera, comprising:
a lens; and
a processor,
   configured to receive an image associated with the lens, wherein the image comprises an embedded color calibration chart, the embedded color calibration chart comprising a constant color property background and a plurality of color blocks with a color property, which varies relative to the constant color property background,
   configured to locate the embedded color calibration chart without intervention of a user by identifying a difference in comparison between the constant color property background and at least one of the plurality of color blocks,
   configured to verify the embedded color calibration chart, and
   configured to create a color profile for the image based on the embedded color calibration chart.

* * * * *

UNITED STATES PATENT AND TRADEMARK OFFICE
CERTIFICATE OF CORRECTION

PATENT NO. : 8,073,248 B2
APPLICATION NO. : 11/811214
DATED : December 6, 2011
INVENTOR(S) : Ralph T. Brunner It is certified that error appears in the above-identified patent and that said Letters Patent is hereby corrected as shown below:

In the Specifications

Column 1, lines 53-55, please delete "The present invention is illustrated by way of example and not limitation in the figures of the accompanying drawings in which like references indicate similar elements." and replace with --The present invention is illustrated by way of example and not limitation in the figures of the accompanying drawings in which like references indicate similar elements. The patent or application file contains at least one drawing executed in color.--

Column 1, line 56, please delete "Figure 1 is an image with an embedded color chart." and replace with --Color drawing as shown Figure 1 is an image with an embedded color chart.-- see attached sheets Column 1, lines 63-65, please delete "Figure 4 illustrates one embodiment of a conversion of an image to grayscale based on the maximum luminance of each pixel." and replace with --Color drawing as shown Figure 4 illustrates one embodiment of a conversion of an image to grayscale based on the maximum luminance of each pixel.-- see attached sheets Column 2, lines 13-14, please delete "Figure 10 illustrates one embodiment of an angle histogram overlaid on an image with an embedded color chart." and replace with --Color drawing as shown Figure 10 illustrates one embodiment of an angle histogram overlaid on an image with an embedded color chart.-- see attached sheets Signed and Sealed this
Eighteenth Day of June, 2013

Teresa Stanek Rea
*Acting Director of the United States Patent and Trademark Office*